US006369757B1

United States Patent
Song et al.

(10) Patent No.: US 6,369,757 B1
(45) Date of Patent: Apr. 9, 2002

(54) SMART ANTENNA WITH ADAPTIVE CONVERGENCE PARAMETER

(75) Inventors: Yoo S. Song; Hyuck M. Kwon, both of Wichita, KS (US); Kyung M. Min, Potomac, MD (US)

(73) Assignee: Neo Reach, Inc., Rockville, MD (US)

( * ) Notice: Subject to any disclaimer, the term of this patent is extended or adjusted under 35 U.S.C. 154(b) by 0 days.

(21) Appl. No.: 09/610,470

(22) Filed: Jul. 5, 2000

(51) Int. Cl.[7] ............................... G01S 3/16; G01S 3/28
(52) U.S. Cl. ......................................................... 342/378
(58) Field of Search .......................... 342/378; 375/232, 375/347; 455/296, 297

(56) References Cited

U.S. PATENT DOCUMENTS 5,524,023 A * 6/1996 Tsujimoto .................... 375/232
5,999,800 A   12/1999 Choi et al.

* cited by examiner

Primary Examiner—Theodore M. Blum

(74) Attorney, Agent, or Firm—Steven B. Kleber; Piper Marbury; Rudnick & Wolfe, LLP

(57) ABSTRACT

A smart antenna, i.e., blind adaptive antenna array, is a method and system to suppress multiple access interference and to improve performance, for example in a code division multiple access (CDMA) wireless communications system, including third generation (3 g) cdma2000 and wide band (W)-CDMA. A convergence parameter is employed in a smart antenna processor. In general, a constant convergence parameter value is empirically determined and used after studying the convergence speed and the steady state mean square error (MSE) or other performance data, such as bit error rate. As the convergence parameter value increases, the convergence speed also increases but the MSE increases unfortunately, and vice versa. The traditional smart antenna with a constant convergence parameter would yield poor performance when the channel environment changes, which is true particularly when a mobile user moves around. In the present invention, the convergence parameter value is adaptively changed and employed in a smart antenna processor. Two exemplary methods to update the convergence parameter are described. By employing such an adaptive convergence parameter value, convergence speed can be increased and the steady state MSE can be decreased.

44 Claims, 7 Drawing Sheets

SMART ANTENNA WITH ADAPTIVE CONVERGENCE PARAMETER

BACKGROUND OF THE INVENTION

1. Field of the Invention

The present invention relates to wireless telecommunications. More particularly, the present invention relates to a novel and efficient smart antenna for a code division multiple access wireless communications system. If the smart antenna in the invention is employed at a base station and a desired mobile user moves around high rise buildings, the smart antenna would work more effectively than other existing smart antennas.

2. Description of the Related Art

In a third generation (3G) wireless communications system, particularly those specified in the wide band (W)-CDMA or the CDMA2000 standard, a base station has an option to employ a smart antenna technology. A smart antenna can suppress interfering signals of different DOAs from the desired users by using spatial diversity. Smart antenna technologies attract much attention these days as they support more users with a high quality of service and high data rates, up to 1.92 mega bits per second (Mbps). Efficient smart antenna schemes have appeared recently. One of them was invented by the present inventors and is in pending U.S. provisional patent application Ser. No. 60/164,552. It would be reasonable to include more realistic environments that have not been considered in the existing literature or inventions.

For example, when a mobile user moves around in a downtown of a city with high rise dense buildings, the direction of arrival angles (DOA) from the desired mobile user's multipath signals may change abruptly at a base station receiver due to local scatters around the mobile user. This phenomena is called "edge effects." One of the roles of a smart antenna at a base station is to track the DOAs of dominant multipath signals. The convergence speed of smart antenna weighting coefficients and the DOA tracking capability are critical issues in the design of smart antennas, especially when these edge effects occur frequently. Most of the existing literature or inventions concerning smart antennas do not include these edge effects, and a constant convergence parameter traditionally has been employed. There is still a need for a smart antenna with a fast convergence speed as well as a small mean square error (MSE) under an edge effect environment. Some of the existing literature, e.g., normalized least mean square (NLMS), have considered a time varying adaptive convergence parameter. Also, U.S. Pat. No. 5,999,800, Choi, has employed a time varying LaGrange multiplier. However, these existing literature or inventions have employed different optimization criteria or different adaptive schemes from the present invention.

BRIEF SUMMARY OF THE INVENTION

A smart antenna that is a blind adaptive antenna array, is a method and system to suppress the multiple access interference and to improve performance of a wireless communications system, including CDMA such as third generation (3G) CDMA2000 and W-CDMA. A parameter is employed in a smart antenna processor. In general, a constant convergence parameter value is empirically determined and used after studying the convergence speed and the steady state MSE or other performance, such as a bit error rate. As the convergence parameter value increases, the convergence speed also increases but the MSE unfortunately increases and vice versa. The smart antenna with a constant convergence parameter would yield poor performance when the channel environment changes, which is true since a mobile user moves around in general. In the present invention, the convergence parameter value is adaptively changed and employed in a smart antenna processor. Two exemplary methods to update the convergence parameter are described. By employing such an adaptive convergence parameter value, the convergence speed can be increased and the steady state MSE can be decreased. Simulation test results confirm that a smart antenna using the adaptive convergence parameter schemes in the present invention shows improved performance for a CDMA system operating under a time-varying fading channel and the edge effects, compared to the existing schemes. In addition, the smart antennas according to the present invention have smaller computation loads than a competitive invention, such as Choi.

In accordance with the invention, there is provided a method of receiving a signal for use in combination with wireless communications. The invention includes the step of receiving a signal in multiple antennas. The received signal is processed utilizing an adaptive convergence parameter. According to one embodiment of the invention, the antennas are a multiple antenna array. According to another embodiment of the invention, the antennas are multiple antennas.

In accordance with one embodiment of the invention, the received signal is processed according to $$\mu(k) = \frac{\gamma - \underline{w}^H(k)R_{yy}(k)\underline{w}(k)}{\gamma^2 + \underline{w}^H(k)R_{yy}^2(k)\underline{w}(k) - 2\gamma - \underline{w}^H(k)R_{yy}(k)\underline{w}(k)}$$

$$= \frac{\gamma - |z(k)|^2}{\gamma^2 + |z(k)|^2\|\underline{y}(k)\|^2 - 2\gamma|z(k)|^2}.$$

In accordance with an alternate embodiment, the signal is processed according to $$\mu(k) = \frac{1}{\gamma + \underline{w}(k)R_{yy}(k)\underline{w}(k)} = \frac{1}{\gamma + |z(k)|^2}.$$

However, the invention is not limited to these two specific algorithms, which are exemplary.

The step of processing includes estimating a direction of arrival angle for antennas, the direction of arrival angle being separate from other signal data. Also included is the step of determining a better weighting coefficient.

In accordance with one alternative, the direction of arrival angle is utilized in forward link transmission. In accordance with another alternative, the direction of arrival angle is utilized in reverse link transmission. Other alternatives include that the antennas are in a base station, or are in a mobile station.

In accordance with the invention, there is further provided a system of receiving a signal for use in combination with wireless communications. The system includes at least one signal processor, responsive to a signal received in more than one antenna, having an adaptive convergence parameter. Optionally, the system includes a transmitter connected to the signal processor. Optionally, the system includes a receiver connected to the signal processor. Optionally, the antennas include multiple antennas. Optionally, the signal processor includes a filter, the filter having the adaptive convergence parameter.

Optionally, the signal processor includes a measurement of a direction of arrival angle for antennas, the measured direction of arrival angle being separate from other signal data. Alternatively, the signal processor further includes a determination of a better weighting coefficient. Alternatively, the measured direction of arrival angle has been obtained from a reverse link transmission.

According to one embodiment, the system includes a base station, wherein the antennas are in the base station. According to another embodiment, the system includes a mobile station, wherein the antennas are in the mobile station.

These and other objects, features and advantages of the present invention are readily apparent from the following drawings and detailed description.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT

The present invention considers a reverse link from a mobile to a base station, although the invention is equally applicable to a forward link beam-forming process, such as in a CDMA wireless communications system. In addition, although the transmitter and receiver in the example is similar to a CDMA2000 system for a demonstration purpose, the present invention is also applicable to other CDMA systems, such as a W-CDMA system when the weight vector in a smart antenna is adaptively generated with a convergence parameter.

Figure 1:
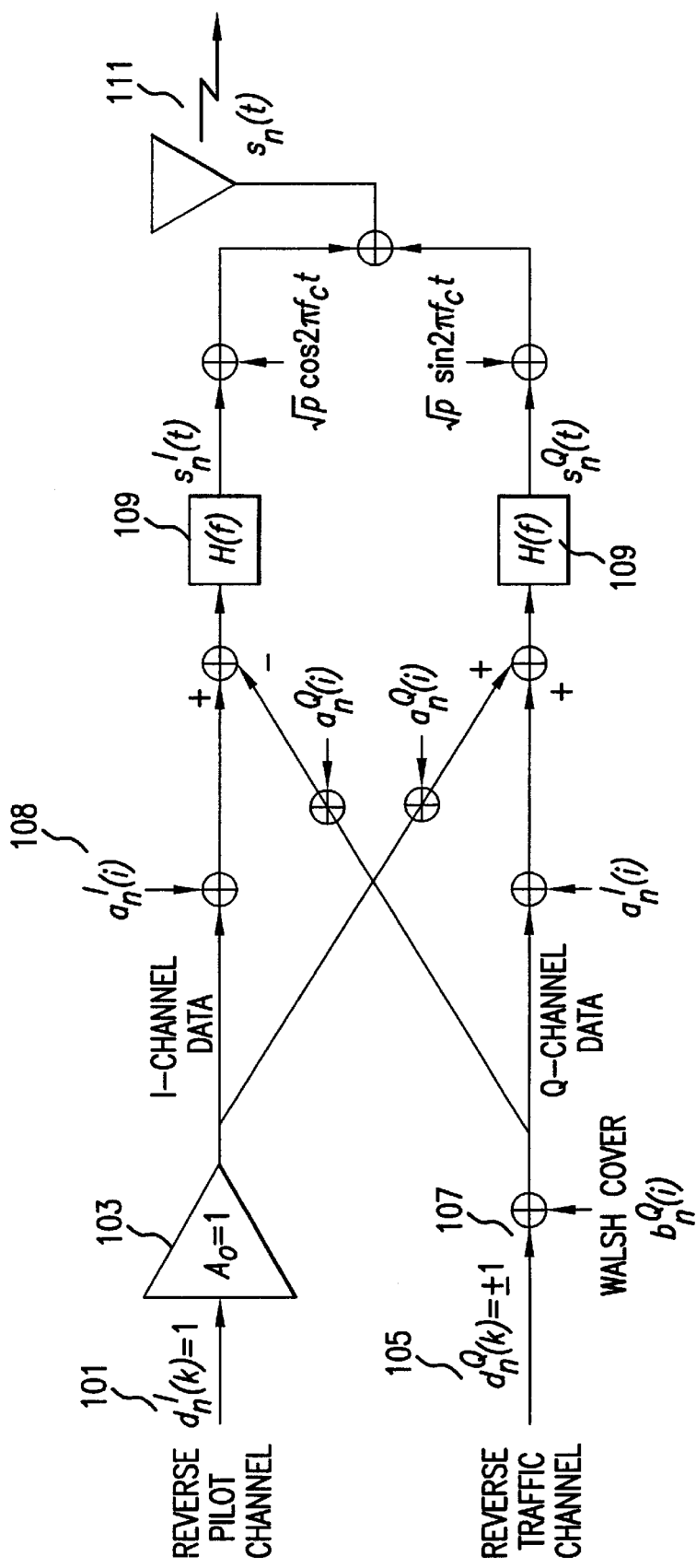
FIG. 1 is an example model of a complex pseudonoise (PN) spread transmitter for a CDMA system configured in accordance with one embodiment of the present invention.

FIG. 1 is an example transmitter spread by a complex PN sequence for a CDMA system like a CDMA2000 or a W-CDMA. The I-channel input data stream 101 $d_n^I(k)$ in the pilot channel is either 1 or a sequence of ±1 known pattern, and the Q-channel input data stream 105 $d_n^Q(k)$ in a traffic channel is a random sequence of ±1 where k denotes the code symbol index and n the user index. The pilot amplitude 103 $A_0$ is set to 1 and Walsh code 107 $b_n^Q(i)$ to ±1 where i denotes the chip index. Each code symbol is spread into G chips where G is called the spreading factor (SF). The I and Q data are complex PN spread with 108 $a_n(i)=a_n^I(i)+ja_n^Q(i)$. The PN spread signal can be written as $$\{A_0 d_n^I(k) b_n^I(i) + j d_n^Q(k) b_n^Q(i)\}\{a_n^I(i) + j a_n^Q(i)\}, (k-1)G \leq i \leq kG \quad (1)$$

where j is the positive square root of (-1). The equivalent lowpass signal after pulse shaping filter 109 $H(f)$ is denoted as $S_n^I(t)+jS_n^Q(t)$. The transmitted signal 111 $S_n(t)$ from the n-th user is written as $$S_n(t)=Re\{\sqrt{P}(S_n^I(t)+jS_n^Q(t))e^{j2\pi f_c t}\}(i-1)T_c \leq t \leq iT_c \quad (2)$$

where t is the time variable, $Re\{z\}$ is the real part of complex number z, P is the transmitted power, $f_c$ is the carrier frequency, and e is the exponential operator, and $T_c$ is the chip time interval.

Figure 2:
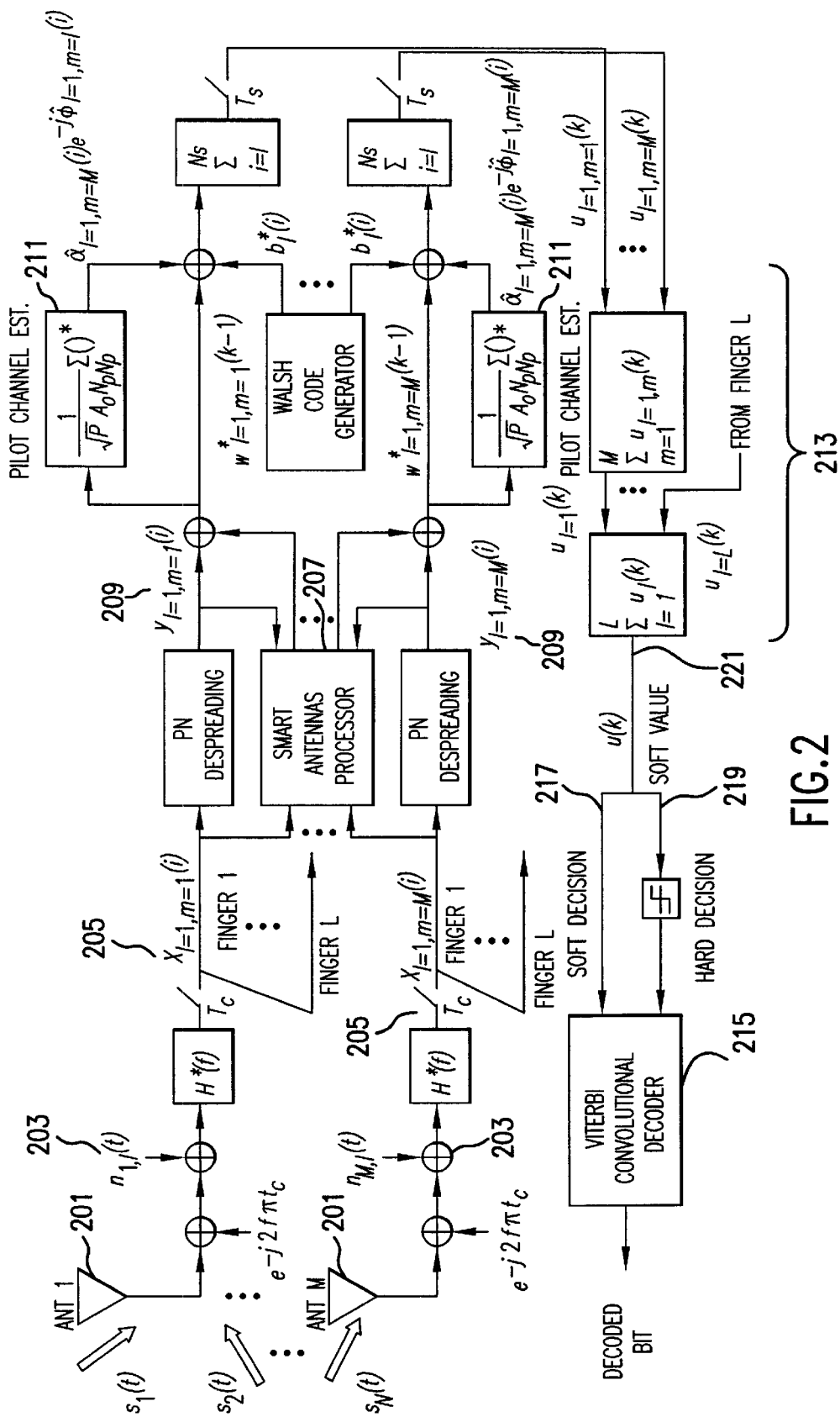
FIG. 2 is an overall block diagram of a base station receiver configured in accordance with one embodiment of the present invention.

FIG. 2 shows an example receiver block diagram with a smart antenna for a CDMA reverse link. The present invention improves performance of the smart antenna in FIG. 2. The number of antenna array elements 201 is M. The array element spacing d is set to $\lambda/2$, where $\lambda$ is a wavelength equal to the speed of light divided by the carrier frequency. The signals arrive substantially identically at each element because the maximum distance between elements is less than or equal to $(M-1)\lambda/2$, which is only 31.6 cm when carrier frequency is 1.9 GHz and M=5. The relative phase difference due to the array element spacing between the reference and the m-th element output is $e^{-j\pi(m-1)d\sin\theta/\lambda}$, m=1, ..., M where $\theta$ is the DOA of the desired signal. The first element is set to be a reference element. The antenna array response vector $\underline{a}(\theta)$ can be written as $$\underline{a}(\theta)=[1 e^{-j\pi\sin\theta} \ldots e^{-j(M-1)\pi\sin\theta}]^T \quad (3)$$

where T is the transpose operator. The received signal at the m-th element, m=1, ..., M, can be written as $$r_m(t)=\sum_{n=1}^{N}\sum_{l=1}^{L}\{s_n(t-\tau_{l,n})\alpha_{l,n}(t)e^{j\phi_{l,n}(t)}e^{-j(m-1)\pi\sin\theta_{l,n}(t)}\}+n_{m,l}(t) \quad (4)$$

where $\tau_{l,n}$, $\alpha_{l,n}(t)$, $\phi_{l,n}(t)$, and $\theta_{l,n}(t)$ are respectively the multipath delay, amplitude, phase and DOA of the l-th path from user n, n=1, ..., N, and $n_{m,l}(t)$ is the additive white Gaussian noise 203 (AWGN). The output of each element is frequency down converted. The baseband filter outputs 205 are sampled every chip interval and denoted as $x_{l,m}(i)$. The smart antenna processor 207 takes pre-PN processing chip vectors $\underline{x}_l(i)$ and post-PN processing chip vectors $\underline{y}_l(i)$. The pilot-aided channel estimates 211 are obtained by taking the average of the post PN despread 209 samples over an interval of $N_p$ chips. The spatial and temporal RAKE combining 213 is performed over m=1, ..., M antenna elements and l=1, ..., L fingers. The soft decision variable u(k) 221 in FIG. 2 is fed into either a Viterbi convolutional decoder 215 in soft decision 217 or hard decision 219 value for the k-th code symbol decoding if a convolutional encoder is employed at the transmitter.

The present invention preferably employs a smart antenna based on maximum output power criteria, such as used in Choi. Other criteria can be used as long as the smart antenna weight vector is updated with an adaptive algorithm. A constant convergence parameter $\mu$ was used in Choi or other existing algorithms.

A cost function based on a maximum output power criteria can be written as $$J(\underline{w}(k)) = \underline{w}^H(k) R_{yy}(k) \underline{w}(k) + \gamma(k)(1 - \underline{w}^H(k) \underline{w}(k)) \quad (5)$$

where $\underline{w}^H(k)$ is the Hermition, that is, conjugate and transpose of M by 1 weight vector $\underline{w}(k)$, $\underline{y}(k)$ is a post PN despread observed M by 1 vector and the m-th component, $y_m(k)$ is the sum of post PN despread samples $y_m(i)$ in FIG. 2 over G chip intervals, $R_{yy}(k)$ is an M by M auto-correlation matrix of $\underline{y}(k)$, and $\gamma(k)$ is a LaGrange multiplier for constraint $\underline{w}^H(k) \underline{w}(k) = 1$. The finger index l is dropped for brevity from now on. And k denotes the update time index, called iteration or snapshot index. In the preferred embodiment, the update rate is set to a code symbol rate, although the update rate can be faster than the code symbol rate. At each iteration, or snapshot, the weight vector is updated as $\underline{w}(k+1) = \underline{w}(k) - \frac{1}{2}\mu \nabla J(\underline{w}(k))$ where $\nabla J(\underline{w}(k))$ is the gradient vector for cost function $J(\underline{w}(k))$ given in equation (5) with respect to $\underline{w}(k)$, and $\mu$ is a convergence parameter. The updated weight vector can be written as $$\underline{w}(k+1) = (1 - \mu\gamma(k))\underline{w}(k) + \mu\underline{y}(k) z(k) \quad (6)$$

where $z(k) = \underline{y}^H(k)$ is the adaptive filter output and $R_{yy}(k)$ is approximated as $\underline{y}(k)\underline{y}^H(k)$. (It was claimed in the Choi device that if LaGrange multiplier $\gamma(k)$ is updated every snapshot under constraint $\underline{w}^H(k)\underline{w}(k) = 1$ instead of using constant value $\gamma$, then $\gamma(k)$ is converged into the maximum eigenvalue of $R_{yy}$ as iteration goes on.)

Conventionally known adaptive filters determine the convergence parameter $\mu$ in equation (6) empirically as a constant. It is a difficult process to determine the convergence parameter $\mu$ when the channel environment keeps changing. Convergence parameter value $\mu$ influences the convergence speed of an adaptive algorithm. If $\mu$ is small, then the convergence speed is low but the excess of mean square error is small, and vice versa. The present invention updates the convergence parameter $\mu(k)$ adaptively, preferably during every snapshot instead of employing a constant convergence parameter all the time. The present invention fixes the LaGrange multiplier $\mu(k)$ as a constant value equal to the maximum eigenvalue of $R_{yy}$, that is, $\gamma(k) = M$ because adaptive $\gamma(k)$ does not change the convergence speed. Therefore, the cost function in equation (5) is changed as $$J(\underline{w}(k)) = \underline{w}^H(k) R_{yy}(k) \underline{w}(k) + \gamma(1 - \underline{w}^H(k) \underline{w}(k)) \quad (8)$$

for the present invention. And the new weight vector $\underline{w}(k+1)$ in equation (6) is found as $$\underline{w}(k+1) = (1 - \mu(k)\gamma)\underline{w}(k) + \mu(k)\underline{y}(k) z(k) \quad (9)$$

by finding the gradient $\nabla J(\underline{w}(k))$ and substituting it into the update equation: $w(k+1) = \underline{w}(k) - \frac{1}{2}\mu(k)\nabla J(\underline{w}(k))$. Also, by taking the derivative of the cost function in equation (8) with respect to $\mu(k)$ and making it equal to zero, an optimum adaptive convergence parameter $\mu(k)$ to minimise the cost function can be found as $$\mu(k) = \frac{\gamma - \underline{w}^H(k) R_{yy}(k) \underline{w}(k)}{\gamma^2 + \underline{w}^H(k) R_{yy}^2(k) \underline{w}(k) - 2\gamma \cdot \underline{w}^H(k) R_{yy}(k) \underline{w}(k)} \quad (10)$$

$$= \frac{\gamma - |z(k)|^2}{\gamma^2 + |z(k)|^2 \|\underline{y}(k)\|^2 - 2\gamma|z(k)|^2}$$

where $|z(k)|$ is the magnitude of complex array output $z(k)$ and $\|\underline{y}(k)\|$ is the inner product of the observed post PN despread vector $\underline{y}(k)$.

A heuristic adaptive convergence parameter $\mu(k)$ can be found as $$\mu(k) = \frac{1}{\gamma + \underline{w}^H(k) R_{yy}(k) \underline{w}(k)} = \frac{1}{\gamma + |z(k)|^2}. \quad (11)$$

The heuristic adaptive convergence parameter in equation (11) is reasonable. When the weight vector $\underline{w}(k)$ does not match with the channel array response vector $\underline{a}(\theta(k))$ of equation (3), the array output $z(k) = \underline{y}^H(k)\underline{w}(k)$ would have little power and the adaptive convergence parameter $\mu(k)$ would be large and the convergence step would be large at iteration k and search processing can be sped up. When weight vector $\underline{w}(k)$ matches with channel array response vector $\underline{a}(\theta(k))$, the array output $z(k) = \underline{y}^H(k)\underline{w}(k)$ would have maximum output power equal to $M^2$ and the adaptive convergence parameter $\mu(k)$ would be small and the excess mean square error would be small.

The convergence of the smart antenna in the present invention can be verified through examining equation (9). The update weight vector can be rewritten as $$\underline{w}(k+1) = [1 - \mu(k)\gamma] \underline{w}(k) + \mu(k)\underline{y}(k) z(k) \quad (12)$$

$$= [I(1 - \mu(k)\gamma) + \mu(k) R_{yy}(k)] \underline{w}(k) \quad (13)$$

$$= [Q\{I(1 - \mu(k)\gamma) + \mu(k)\Lambda\} Q^H]^{k+1} \underline{w}(0) \quad (14)$$

$$= Q[I(1 - \mu(k)\gamma) + \mu(k)\Lambda]^{k+1} Q^H \underline{w}(0) \quad (15)$$

where Q is a unitary matrix satisfying $R_{yy} = Q\Lambda Q^H$, $\Lambda$ is a diagonal matrix with the i-th diagonal element equal to the i-th largest eigenvalue of matrix $R_{yy}$, and $\underline{w}(0)$ is the initial weight vector set to $(1, 1, \ldots, 1)^T$. The bracket matrix raised with power $(k+1)$ in equation (15) is a diagonal matrix and diagonal values decrease as iteration goes on if $|1 - \mu(k)\gamma + \mu(k)\lambda_{max}| \leq 1$. Therefore, $\gamma$ is set to $\lambda_{max} = M$.

For a comparison purpose, a Wiener filter is re-examined for the smart antenna application. The M by 1 PN-despread output vector is represented as $\underline{y}(k) = b_1 \underline{a}(\theta_1) + \underline{n}(k)$ where $b_1$ and $\underline{a}(\theta_1)$ are a data bit of $\pm 1$ and an array response vector of DOA $\theta_1$ from user 1, respectively, and $\underline{n}(k)$ is the interference plus thermal noise vector. The desired adaptive filter output or the reference signal can be set to $d = \underline{a}^H(\theta_1)$ $\underline{a}(\theta_1) = M$ for a Wiener filter. Ideally, the cross correlation vectors can be written as $$\underline{p} = E(d^* \underline{y}(k)) \quad (16)$$

$$= \underline{a}^H(\theta_1) \underline{a}(\theta_1) E(\underline{a}(\theta_1) + \underline{n}(k)) \quad (17)$$

$$= M \underline{a}(\theta_1). \quad (18)$$

Then, the ideal Wiener solution can be obtained as $$\underline{w}_0 = R_{yy}^{-1} \underline{p} \quad (19)$$

$$= [Q\Lambda Q^H]^{-1} M \underline{a}(\theta_1) \quad (20)$$

$$= MQ\Lambda^{-1} Q^H \underline{a}(\theta_1) \quad (21)$$

$$= M[\underline{q}_1, \ldots, \underline{q}_M][\lambda_1^{-1}, \ldots, \lambda_M^{-1}][\underline{q}_1, \ldots, \underline{q}_M]^H \underline{q}_1 \sqrt{M} \quad (22)$$

$$= M\sqrt{M}[\underline{q}_1, \ldots, \underline{q}_M][\lambda_1^{-1}, \ldots, \lambda_M^{-1}][1, 0, \ldots, 0]^H \quad (23)$$

$$= M\sqrt{M} \lambda_1^{-1} \underline{q}_1 \quad (24)$$

$$= M\sqrt{M} \lambda_1^{-1} \underline{a}(\theta_1)/\sqrt{M} \quad (25)$$

$$= M\lambda_1^{-1} \underline{a}(\theta_1) \quad (26)$$

where $\underline{a}(\theta_1) = \underline{q}_1 \sqrt{M}$ was used in equation (22). The array response vector $\underline{a}(\theta_1)$ in equation (26) can be obtained by multiplying the conjugate of the pilot channel estimation to compensate the fading phase distortion and keep the DOA components only at each element. The simulation test results for Wiener filter are compared to those obtained with the present invention by using the pair of equations (9) and (10) for optimum adaptive convergence parameter and the pair of equations (9) and (11) for a heuristic adaptive convergence parameter algorithm.

For comparison, other typical adaptive algorithms were also tested through simulation and compared with the present invention. For example, least mean square (LMS), normalized least mean square (NLMS), recursive least square (RLS), minimum mean square error (MMSE) proposed by the present inventors, the Choi device, and an adaptive algorithm with perfect weight vector set to the array response vector were tested through simulation. Instantaneous matrix $R_{yy}(k)=\underline{y}(k)\underline{y}^H(k)$ was used for all adaptive algorithms if the algorithm requires $R_{yy}$. This approximation is reasonable for an urban environment when the channel is subject to edge effects and multipath fading environments. The Wiener filter is an optimum solution under a pure AWGN stationary environment. However, the Wiener solution may not be the best under a channel subject to frequent edge effects. In addition, even if a perfect weight vector is employed, some degradation is expected due to the presence of a noise vector. Parameters for simulation test environments, including one embodiment of the present invention, are listed in TABLE 1.

TABLE 1

Parameters used for simulation test environments.

| Description | Notation | Number |
|---|---|---|
| Carrier frequency | $f_c$ | 1.9 Giga Herz |
| Chip rate | $R_c$ | 1.2288 Mcps |
| Mobile velocity | v | 70 km/h |
| Doppler frequency | $f_D = f_c\, v/c$ | 123 Hz |
| Number of Jake fading multipaths | L | 1 |
| Number of antennas | M | 3 |
| Number of users | N | 2 |
| Interference signal strength | I | I = Desired signal strength S = 1 |
| Spreading factor | G | 16 |
| Pilot channel amplitude | $A_0$ | 1 |
| Number of chips for pilot channel estimation | $N_p$ | 512 |
| Mobile distance from base station | R | 1 km |
| Snapshot interval | $T_{snapshot} = GT_c = G/R_c$ | 13.02 μs |
| DOA change per snapshot due to mobile circular movement | $\theta(k) - \theta(k-1) = vT_{snapshot}/R$ | $4.56 \times 10^{-6\circ}$ per snapshot |
| Maximum DOA change due to edge effects | $\Delta\theta_{max}$ | $\pm 60°$ |
| Number of edge effects | Randomly occurrence in a frame of 20 ms | 10, 100, 1000 times per 20 ms |
| Bit energy-to-noise density ratio | $E_b/I_0$ | 10 dB |
| Convergence parameter for LMS | $\mu$ | 0.01 |
| Convergence parameter for NLMS | $\mu$ | 0.1 |
| Convergence parameter for Choi | $\mu$ | 0.01 |
| Forgetting factor for RLS | f | 0.98 |

Figure 3:
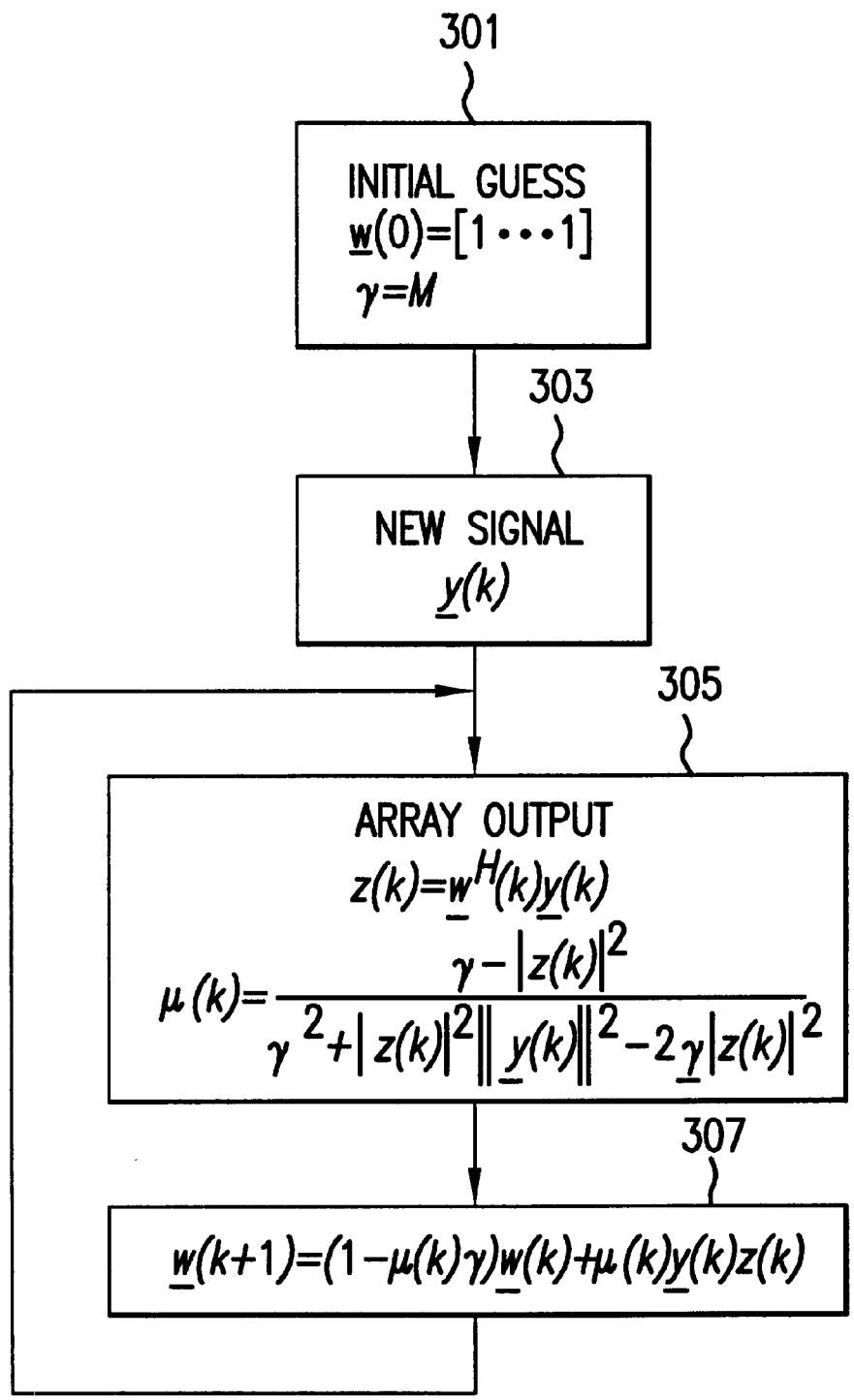
FIG. 3 shows a flow chart of a smart antenna processor with an optimum convergence parameter algorithm configured in accordance with one embodiment of the present invention.
Figure 4:
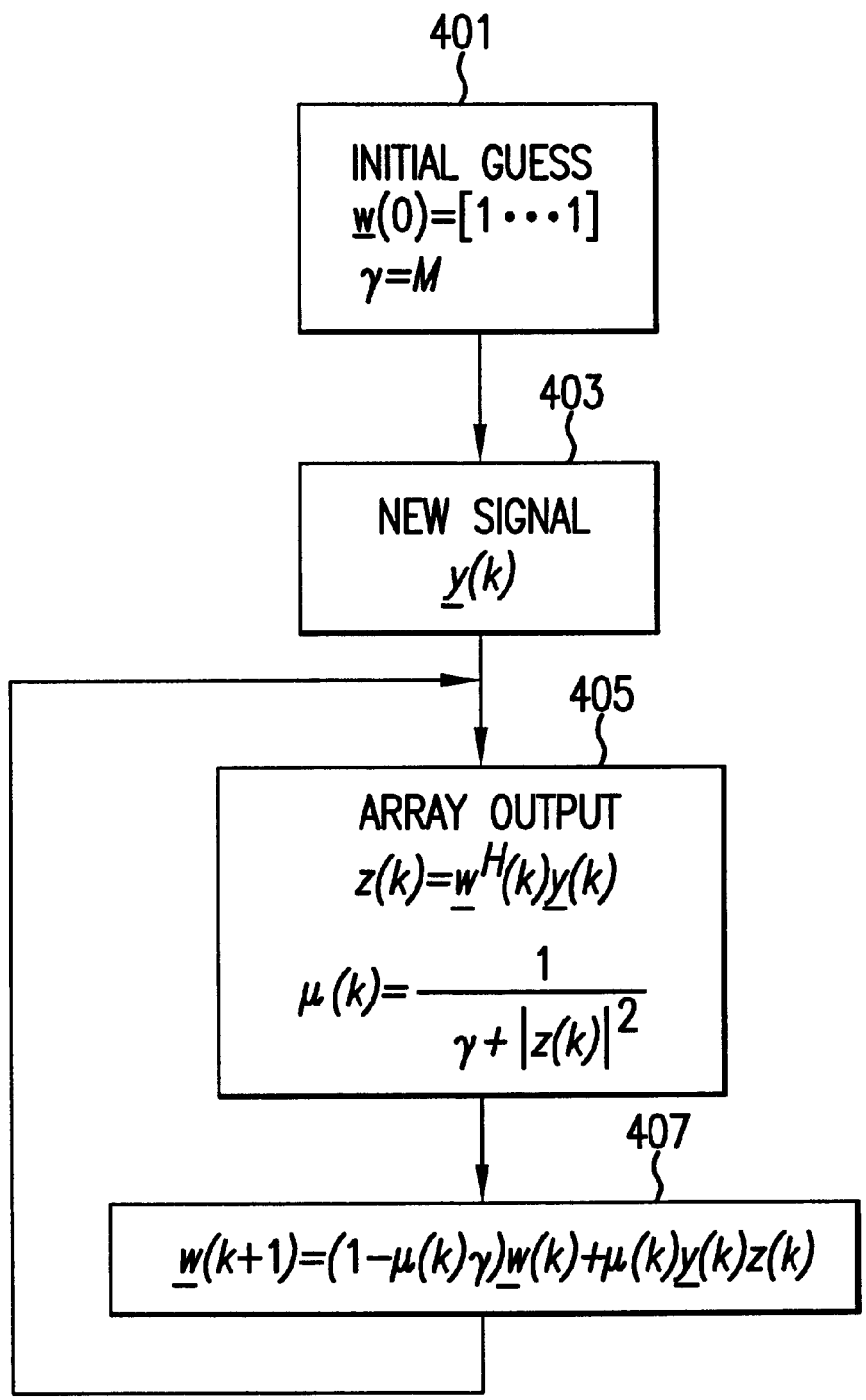
FIG. 4 shows a flow chart of a smart antenna processor with a heuristic convergence parameter algorithm configured in accordance with one embodiment of the present invention.

FIG. 3 and FIG. 4 show flow charts for an optimum adaptive algorithms and a heuristic adaptive convergence parameter algorithm, respectively, in the present invention, which use pairs of equations {(9), (10)} and {(9), (11)}, respectively.

FIG. 3 illustrates an adaptive convergence algorithm for a smart antenna processor.

At step 301, the system makes an initial guess at weight vector w(0) set to (1, . . . 1), and fixes the LaGrange multiplier γ at $\lambda_{max}$ (which is equal to M) At step 303, a new signal is received and the post PN despread signal is observed and taken as the new signal vector $\underline{y}(k)$. Steps 305 and 307 correspond to the smart antenna processor (207 in FIG. 2). At step 305, the array output is determined as the complex array output z(k), and an optimal adaptive convergence parameter $\mu(k)$ is determined (according to equation (10)). At step 307, the new weight vector $\underline{w}(k+1)$ is determined (according to equation (9)).

FIG. 4 illustrates an alternative example of an adaptive convergence algorithm for a smart antenna processor; this example is heuristic.

At step 401, the system makes an initial guess at weight vector and fixes the LaGrange multiplier as a constant. At step 403, a new signal is received and the post PN despread $\underline{y}(k)$ is obtained. At step 405, the array output is determined as the complex array output z(k), and an adaptive convergence parameter $\mu(k)$ is determined (according to equation (11)). At step 407, the new weight vector $\underline{w}(k+1)$ is determined (according to equation (9)).

Figure 5:
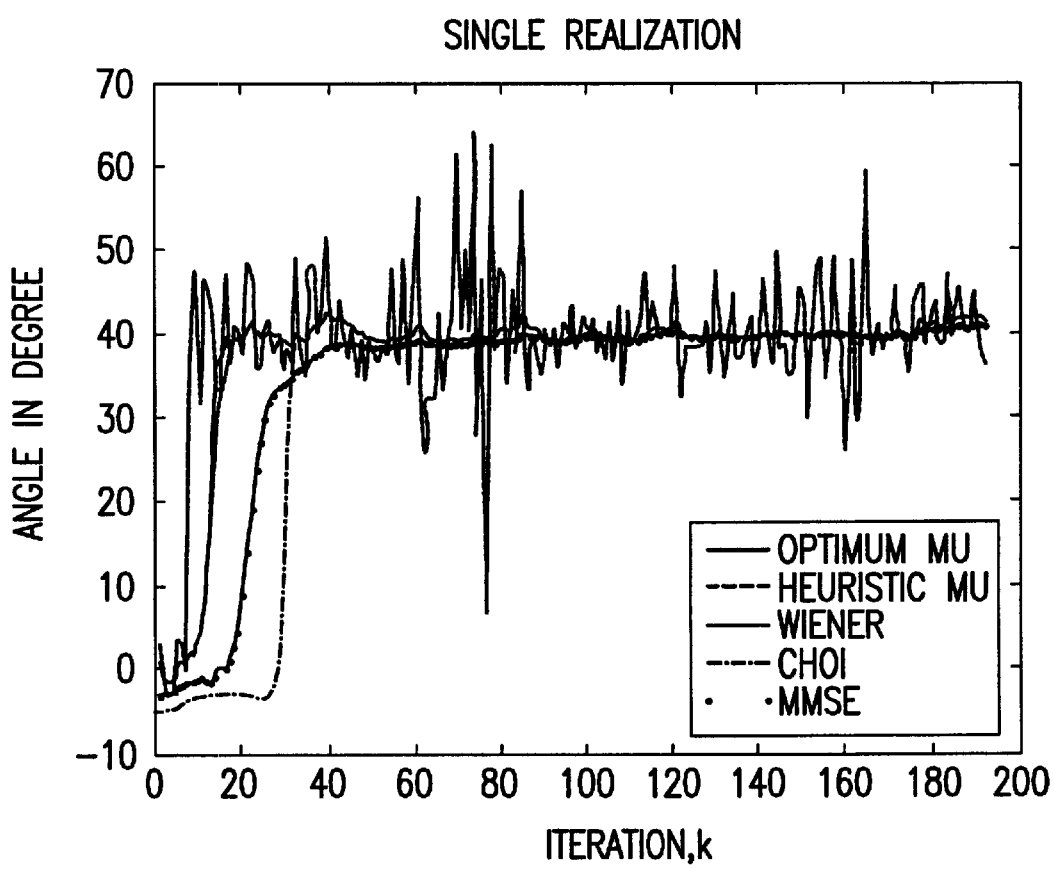
FIG. 5 shows some simulation DOA estimate results versus iteration with a single realisation, indicating that the smart antennas configured in accordance with one embodiment of the present invention have faster convergence speed and smaller mean square error.

FIG. 5 shows a single realization of the DOA estimates versus iteration (i.e., snapshot) index k for different adaptive algorithms. The results for the LMS, NLMS, and RLS were also tested through simulation, but not shown in FIG. 5. These algorithms track the total angle of the input including the fading phase, thermal noise phase, and the DOA, while the two adaptive convergence parameter algorithms in the present invention (optimum mu and heuristic mu), the MMSE in the co-pending US patent disclosure by the present inventors, Wiener, and Choi's algorithms can track the DOAs separately. Each snapshot takes G number of chips to update the weight vector since snapshot rate was set to code symbol rate. The edge effect, or DOA of the desired signal jumps from 0° to 40° at the 10-th iteration. The initial weight vectors for all algorithms were set so that the estimated DOA is equal to 0° before the first edge effect occurrence at the 10-th iteration. FIG. 5 indicates that the smart antenna algorithm has a fast convergence speed and a small mean square error.

Also, FIG. 5 indicates that the two adaptive convergence algorithms in the present invention take only four iterations while Choi's invention takes twenty-two iterations to reach 90% of the target DOA equal to 40°. The Wiener algorithm can converge faster than the present invention, but shows large ripples in a steady state. Therefore, the adaptive convergence algorithms as in the present invention, perform better in both views of convergence speed and the mean square error at a steady state.

Figure 6:
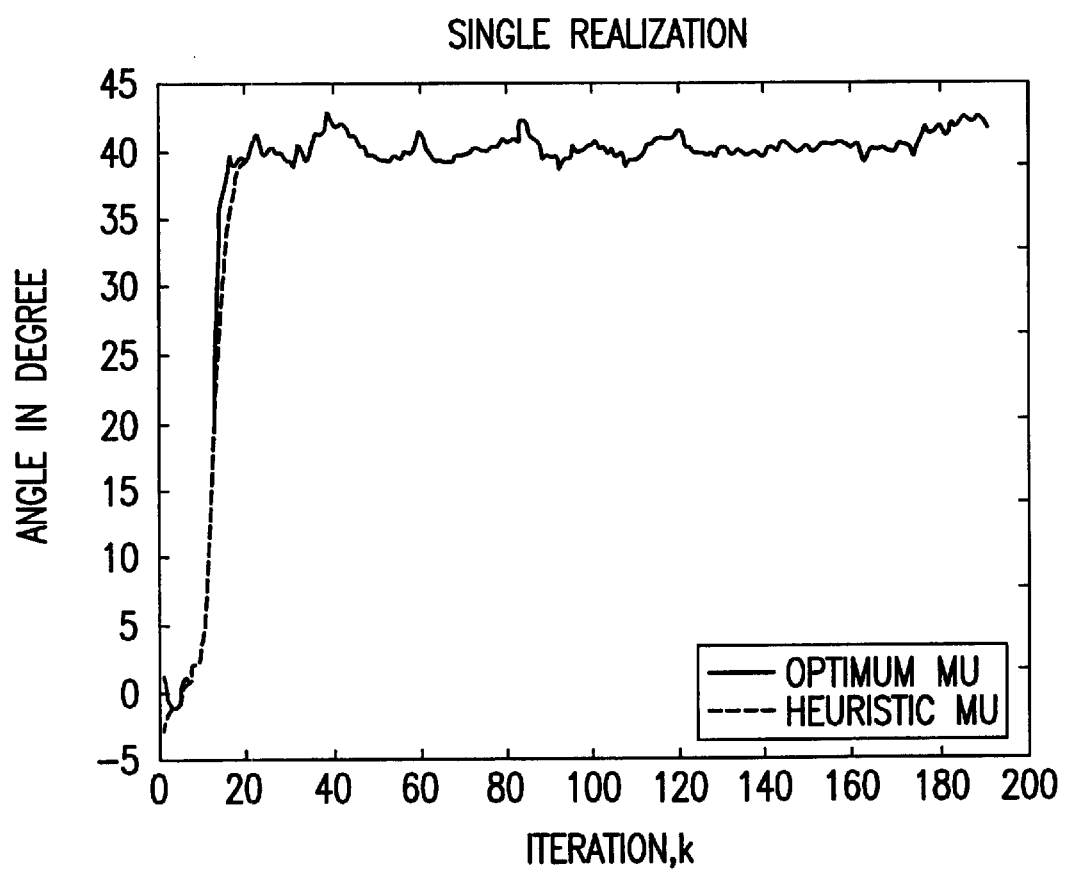
FIG. 6 shows two curves separately from FIG. 5 for the two adaptive convergence algorithms in the present invention.

FIG. 6 shows two curves from FIG. 5 for the two adaptive convergence algorithms in the present invention (optimum mu and heuristic mu). The angle tracking behavior of the optimum adaptive convergence parameter algorithm in equations (9) and (10) is slightly faster than that of the heuristic adaptive convergence parameter algorithm in equations (9) and (11). However, the MSE of the optimum convergence parameter algorithm can be slightly larger than of the heuristic adaptive convergence parameter algorithm because the optimum $\mu(k)$ is to minimize the cost function $J(\underline{w}(k))$ in equation (8) and is not necessary to minimize the MSE.

Figure 7:
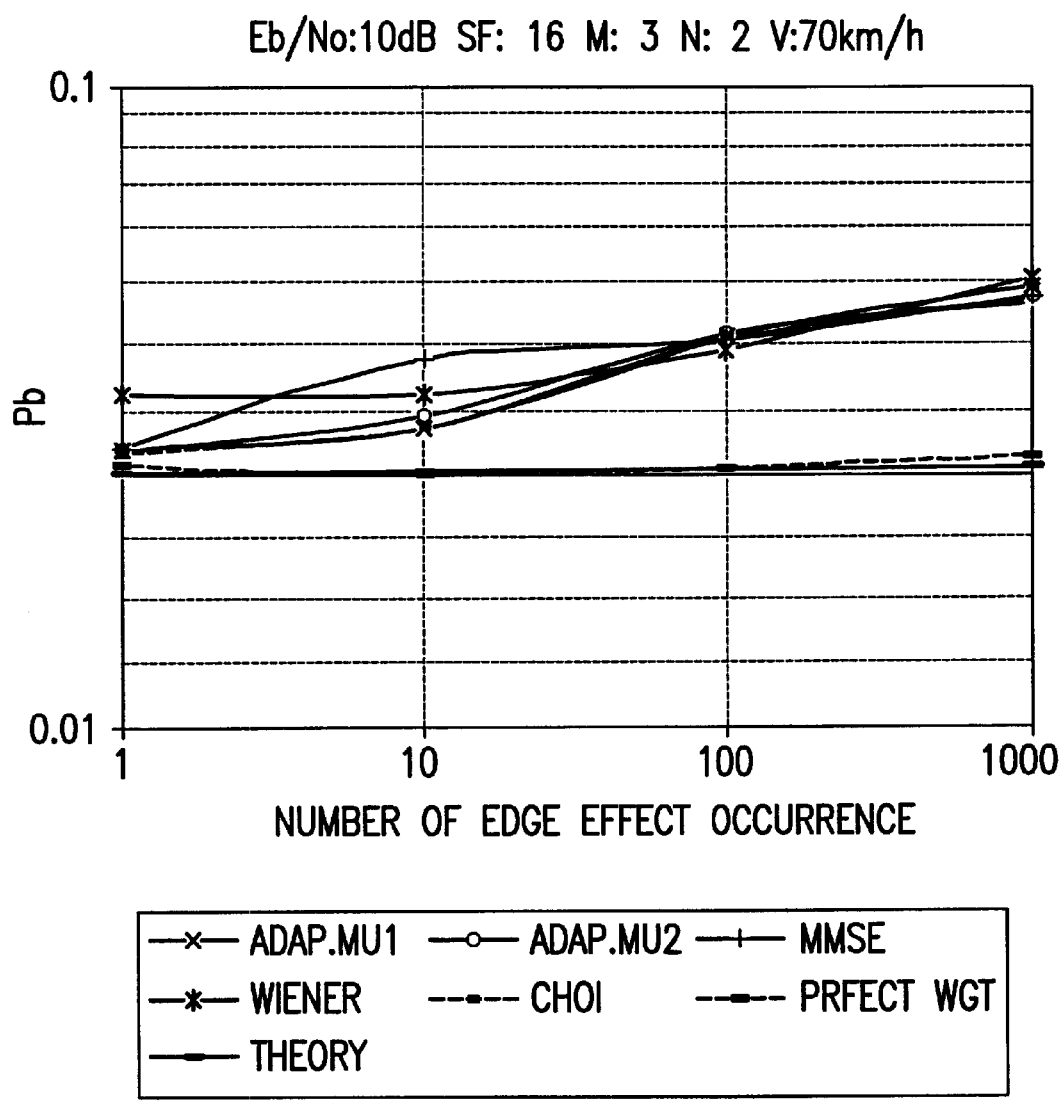
FIG. 7 shows some simulation bit error rate (BER) results versus the number of edge effect occurrences in a frame of 20 ms, indicating that the smart antenna configured in accordance with one embodiment of the present invention shows slightly better performance under edge effects.

FIG. 7 shows the uncoded BER performance of a CDMA system with smart antennas versus the number of edge effect occurrences in a frame interval of 20 ms by using the different adaptive algorithms. The BER performances of all algorithms are close to each other. The adaptive convergence algorithms in the present invention and Choi's algorithm are almost the same and are slightly better than others. The BER of the algorithm with the perfect weight vector matches the theoretical BER.

TABLE 2 is the list of the number of computations per snapshot for each smart antenna where M is the number of antenna array elements configured in accordance with one embodiment of the present invention that shows smaller number of computations per snapshot than Choi's device. TABLE 2 summarises the number of complex computations per snapshot. The RLS requires the most and Wiener, the least number of computations per snapshot. The number of computations per snapshot for the adaptive convergence algorithm in the present invention is less than Choi's device.

TABLE 2

| Adaptive algorithm | Number of complex computations/snapshot |
|---|---|
| LMS | 3M |
| NLMS | 4M |
| RLS | $3M^2 + 2M$ |
| Optimum adaptive convergence parameter | 6.5M |
| Heuristic adaptive convergence parameter | 4.5M |
| MMSE | 4M |
| Wiener | M |
| Choi | 5.5M |

Finally, an estimate θ of the DOA from the desired user signal can be obtained with the adaptive algorithms in the present invention. The weight vector $\underline{w}(k)$ would approach to the array response vector $\underline{a}(\theta)$ in equation (3) when the smart antenna tracks the direction of the arrival angle from the desired signal and the weight vector is normalised every iteration by the first element of the weight vector. The estimate of the DOA can be obtained as $$\hat{\theta}(k) = \sin^{-1}\left(\frac{\angle w_2(k)}{-\pi}\right) \quad (27)$$

where $\sin^{-1}()$ is the arcsine function, $\angle z$ is the angle of z, $w_2(k)$ is the second element of the weight vector $\underline{w}(k)$ at iteration k, and π is the radian angle for 180°. The DOA estimate $\hat{\theta}$ obtained through the present invention can be employed for the other way beam forming, i.e., forward link beam forming. A forward link implies the channel from a base station to a mobile station, and a reverse link is a channel from a mobile to a base station. The weight vector $\underline{w}(k)$ obtained with the present invention through a reverse link can be used for a forward link beam forming from a transmitter in the base station to a receiver in the desired mobile receiver after compensating the phase rotation due to the carrier frequency difference between the forward and reverse link. Therefore, performance of the forward link can be also improved with the present invention.

TABLE 3 is a list of the mean square errors for each smart antenna under edge effects including transient periods, and the steady state mean square errors in accordance with one embodiment of the present invention, that shows a comparable mean square error to the competitive invention. TABLE 3 lists the MSE between DOA estimate $\hat{\theta}$ and true DOA θ for several different DOA tracking algorithms for two cases: (1) simulation test intervals including transient periods, and (2) only steady state portions. The steady state MSE was obtained by averaging the squares of errors every edge effect interval from the iteration point whose tracking angle reaches 90% of the target angle first time to the next edge effect. Ten, one hundred, and one thousand number of edge effects were randomly generated every 20 ms for simulation tests. The present invention and Choi's device have a smaller steady state MSE than others, and Wiener has the largest steady state MSE.

TABLE 3

Mean Square Error (MSE) = $E(|\hat{\theta}-\theta|^2)$

| | MSE measured by including transient periods. Number of edge effect occurrences per 20 ms | | | MSE measured for only steady |
|---|---|---|---|---|
| | 1 | 10 | 100 | state intervals |
| Optimum adaptive convergence parameter | 123.1 | 712.4 | 1146.2 | 0.882 |
| Heuristic adaptive convergence parameter | 121.7 | 701.8 | 1124.5 | 0.770 |
| MMSE | 256.5 | 1055.2 | 1364.2 | 1.293 |
| WIENER | 96.9 | 162.7 | 727.8 | 87.973 |
| CHOI | 255.0 | 1049.9 | 1376.0 | 0.683 |

In conclusion, a smart antenna having either optimum or heuristic adaptive convergence parameter algorithms of the present invention, can be more effective than conventional systems under an edge effect environment particularly for a CDMA reverse link. The adaptive convergence parameter algorithms in the present invention show much better DOA tracking capability and slightly better bit error rate performance than a conventional device. Furthermore, the number of computation loads per snapshot for the heuristic adaptive convergence parameter algorithm is smaller than that in the conventional device.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method of receiving a signal for use in combination with wireless communications, comprising the steps of:

receiving a signal in a plurality of antennas; processing the received signal utilizing an adaptive convergence parameter, wherein the adaptive convergence parameter is substantially equal to $$\frac{\gamma - |z(k)|^2}{\gamma^2 + |z(k)|^2 \|\underline{y}(k)\|^2 - 2\gamma|z(k)|^2}.$$

2. The method of claim 1, wherein the plurality of antennas is a multiple antenna array.

3. The method of claim 1, wherein the plurality of antennas are multiple antennas.

4. The method of claim 1, further including the step of estimating a direction of arrival angle for antennas, said direction of arrival angle being separate from other signal data.

5. The method of claim 1, further including the step of updating a weighting coefficient.

6. The method of claim 4, further comprising the step of utilizing the direction of arrival angle in forward link transmission.

7. The method of claim 4, further comprising the step of utilizing the direction of arrival angle in reverse link transmission.

8. The method of claim 1, wherein the antennas are in a base station.

9. The method of claim 1, wherein the antennas are in a mobile station.

10. A system of receiving a signal for use in combination with wireless communications, comprising:

(A) at least one signal processor, responsive to a signal received in a plurality of antennas, having an adaptive convergence parameter substantially equal to $$\frac{\gamma - |z(k)|^2}{\gamma^2 + |z(k)|^2 \|\underline{y}(k)\|^2 - 2\gamma|z(k)|^2}.$$

11. The system of claim 10, further comprising the plurality of antennas.

12. The system of claim 11, wherein the plurality of antennas includes a multiple antenna array.

13. The system of claim 10, further comprising a transmitter connected to the at least one signal processor.

14. The system of claim 10, further comprising a receiver connected to the at least one signal processor.

15. The system of claim 11, wherein the plurality of antennas includes multiple antennas.

16. The system of claim 10, wherein the at least one signal processor includes a filter, the filter having the adaptive convergence parameter.

17. The system of claim 10, wherein the at least one signal processor includes a measurement of a direction of arrival angle for a plurality of antennas, said measured direction of arrival angle being separate from other signal data.

18. The system of claim 10, wherein the at least one signal processor is configured to perform the step of updating a weighting coefficient.

19. The system of claim 17, wherein the measured direction of arrival angle has been obtained from a forward link transmission.

20. The system of claim 15, wherein the measured direction of arrival angle has been obtained from a reverse link transmission.

21. The system of claim 11, further comprising a base station, wherein the plurality of antennas are in the base station.

22. The system of claim 11, further comprising a mobile station, wherein the plurality of antennas are in the mobile station.

23. A method of receiving a signal for use in combination with wireless communications, comprising the steps of:

(A) receiving a signal in a plurality of antennas;

(B) processing the received signal utilizing an adaptive convergence parameter, wherein the adaptive convergence parameter is substantially equal to.

$$\frac{1}{\gamma + |z(k)|^2}.$$

24. The method of claim 23, wherein the plurality of antennas is a multiple antenna array.

25. The method of claim 23, wherein the plurality of antennas are multiple antennas.

26. The method of claim 23, further including the step of estimating a direction of arrival angle for antennas, said direction of arrival angle being separate from other signal data.

27. The method of claim 23, further including the step of updating a weighting coefficient.

28. The method of claim 26, further comprising the step of utilizing the direction of arrival angle in forward link transmission.

29. The method of claim 28, further comprising the step of utilizing the direction of arrival angle in reverse link transmission.

30. The method of claim 23, wherein the antennas are in a base station.

31. The method of claim 23, wherein the antennas are in a mobile station.

32. A wireless communications system comprising:

at least one signal processor, responsive to a signal received in a plurality of antennas, having an adaptive convergence parameter substantially equal to.

$$\frac{1}{\gamma + |z(k)|^2}.$$

33. The system of claim 32, further comprising the plurality of antennas.

34. The system of claim 33, wherein the plurality of antennas includes a multiple antenna array.

35. The system of claim 32, further comprising a transmitter connected to the at least one signal processor.

36. The system of claim 32, further comprising a receiver connected to the at least one signal processor.

37. The system of claim 33, wherein the plurality of antennas includes multiple antennas.

38. The system of claim 32, wherein the at least one signal processor includes a filter, the filter having the adaptive convergence parameter.

39. The system of claim 32, wherein the at least one signal processor includes a measurement of a direction of arrival angle for a plurality of antennas, said measured direction of arrival angle being separate from other signal data.

40. The system of claim 32, wherein the at least one signal processor is configured to update a weighting coefficient.

41. The system of claim 39, wherein the measured direction of arrival angle has been obtained from a forward link transmission.

42. The system of claim 39, wherein the measured direction of arrival angle has been obtained from a reverse link transmission.

43. The system of claim 33, further comprising a base station, wherein the plurality of antennas are in the base station.

44. The system of claim 33, further comprising a mobile station, wherein the plurality of antennas are in the mobile station.

* * * * *